Dec. 1, 1970   SHIN-ICHI KAWADA   3,543,587
GYROSCOPIC INSTRUMENT
Filed Oct. 1, 1968   2 Sheets-Sheet 1
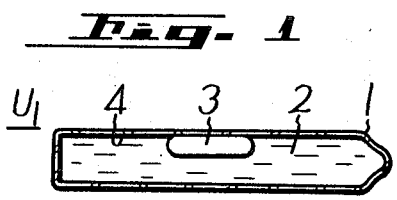
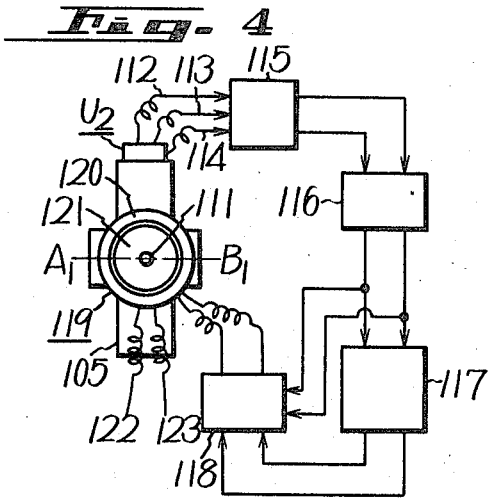
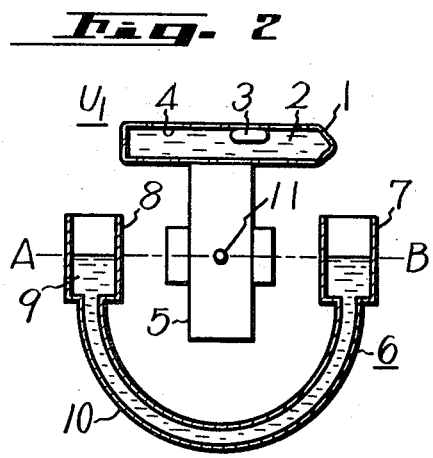
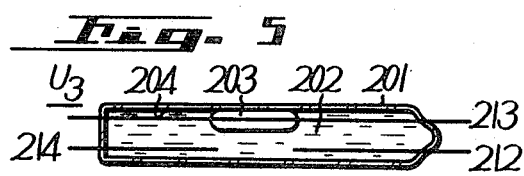
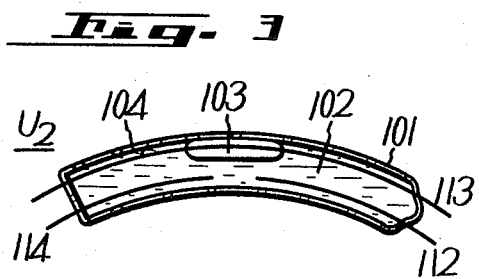
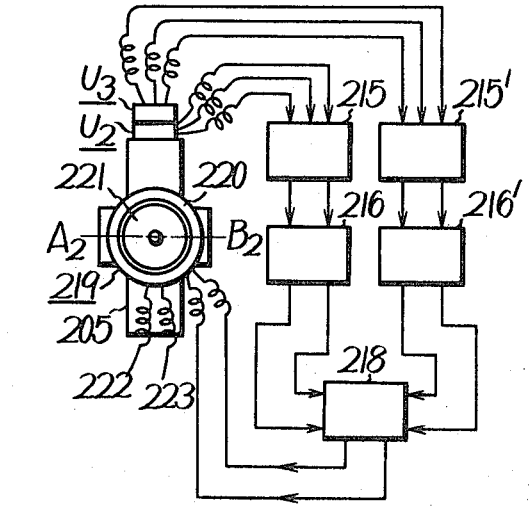
INVENTOR.
Shin-Ichi Kawada
BY *Hill, Sherman, Meroni, Gross & Simpson* ATTORNEYS

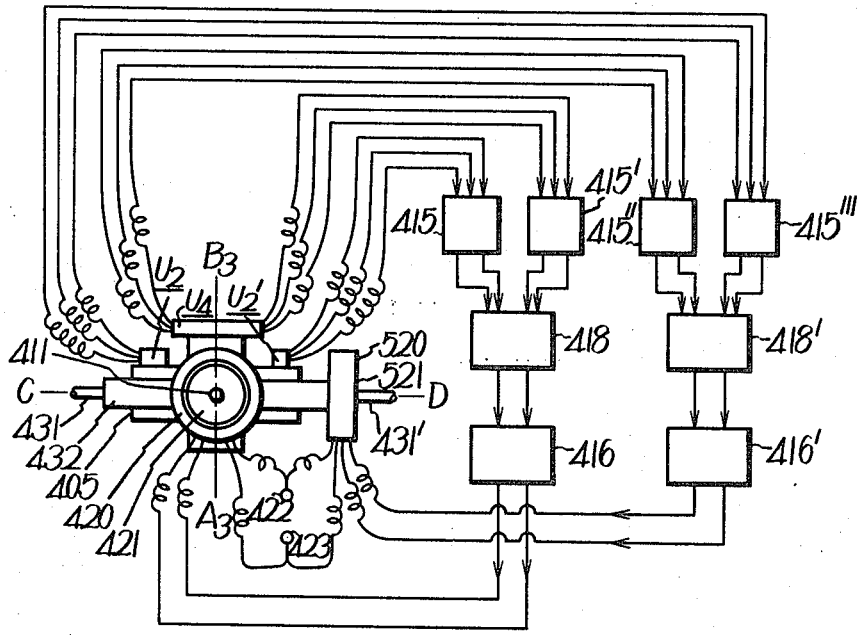

United States Patent Office 3,543,587
Patented Dec. 1, 1970

3,543,587
GYROSCOPIC INSTRUMENT
Shin-Ichi Kawada, Yokohama-shi, Kanagawa-ken, Japan, assignor to Kabushikikaisha Tokyo Keiki Seizosho (Tokyo Keiki Seizosho Co., Ltd.), Tokyo, Japan, a corporation of Japan
Filed Oct. 1, 1968, Ser. No. 764,071
Claims priority, application Japan, Oct. 7, 1967, 42/64,616
Int. Cl. G01c *19/28, 19/46*
U.S. Cl. 74—5.6      3 Claims

ABSTRACT OF THE DISCLOSURE

A gyroscopic instrument having a tilt integrator consisting of a sealed container, a fluid enclosed therein, a moving member insoluble in and nonmiscible with the fluid, having a specific gravity different from that of the fluid and movably disposed in the sealed container, torque generator means, a gyroscope, and means for detecting the position of the moving member in the form of an electric signal.

BACKGROUND OF THE INVENTION

Field of the invention

This invention relates to gyroscopic instruments such as a gyrocompass, vertical gyro, azimuth and attitude differencer system and so on which are equipped with special means for detecting a time integral of an inclination of a reference plane or line of an object relative to a horizontal level of its location.

Description of the prior art

A tilt integrator heretofore employed in gyroscopic instrument has a defect such that a torque produced in proportion to the integral of its inclination is too small for its volume. In the case where a tilt integral torque is produced by electrically integrating the output of an accelerometer, the electrical integrator is very expensive. Further, the conventional integrator cannot be used with vertical gyros.

SUMMARY OF THE INVENTION

One object of this invention is to provide a gyroscopic instrument which is free from the drawbacks encountered in the prior art.

Another object of this invention is to provide a gyroscopic instrument which is high in precision.

Still another object of this invention is to provide a gyroscopic instrument having a tilt integrator which is simple in construction, easy to produce and inexpensive.

Other objects, features and advantages of this invention will become apparent from the following description taken in conjunction with the accompanying drawings.

BRIEF DESCRIPTION OF THE DRAWING

FIG. 1 is a cross-sectional view schematically illustrating one example of a tilt integrator employed in a conventional gyrocompass;

FIG. 2 is a schematic diagram for explaining the principles of the gyrocompass equipped with the tilt integrator depicted in FIG. 1;

FIG. 3 is a cross-sectional view schematically illustrating one example of a known accelerometer for use with gyro;

FIG. 4 is a schematic explanatory diagram of a gyrocompass employing the accelerometer shown in FIG. 3;

FIG. 5 is a cross-sectional view schematically illustrating one example of a tilt integrator of this invention;

FIG. 6 is a schematic explanatory diagram of the tilt integrator of this invention shown in FIG. 5 as applied to a gyrocompass;

FIGS. 7 and 8 illustrate in cross section other examples of the tilt integrator of this invention;

FIG. 9 shows in perspective another example of the tilt integrator of this invention; and FIG. 10 is a schematic explanatory diagram of a vertical gyro employing the tilt integrator shown in FIG. 9.

DESCRIPTION OF THE PREFERRED EMBODIMENTS

In order to facilitate a better understanding of the present invention, a description will be given first of a gyrocompass equipped with a known tilt integrator. FIG. 1 illustrates in cross section a known integrator for use with gyrocompasses, in which reference character $U_1$ indicates generally a tilt integrator having a tube containing therein a fluid 2 and a bubble 3. The gyrocompass equipped with the known tilt integrator is disclosed in my U.S. Pat. No. 3,321,841, issued May 30, 1967. The tube 1 is cylindrical as shown in the figure and its inner surface 4 which the bubble 3 touches is not curved and straight in the plane of the sheet of the drawing, different from a usual spirit level.

When the tilt integrator $U_1$ is inclined relative to the horizontal, the bubble 3 moves on toward a higher end of the tube 1 and the moving speed of the bubble 3 is substantially proportionate to the inclination angle of the unit $U_1$. When the tilt integrator $U_1$ is held horizonal the bubble 3 can rest at any position in the tube 1. Since the position of the bubble 3 is in proportion to the integrated value of the inclination of the unit $U_1$ as described above, the position of the center of gravity of the unit $U_1$ varies proportionally in response to travel of the bubble 3 and is also in proportion to the integrated value of the inclination of the unit $U_1$ for the above reason.

In FIG. 2 there is illustrated, by way of example, a gyrocompass having the tilt integrator $U_1$ mounted on a gyro case 5 with a gyro rotor incorporated therein, in which case the spin axis of the gyro rotor lies in the sheet of the drawing and on the chain line A–B. While, a horizontal shaft 11 of the gyro (which is directly mounted on the gyro case 5 or on a support ring supporting the gyro case) lies at right angles to the line A–B and in a horizontal plane. A north-seeking means in the gyrocompass is a unit by means of which a torque proportional to the inclination of the spin axis (indicated as by the line A–B) from the horizontal is applied to the gyro case 5 about the horizontal shaft 11. In the figure a known liquid ballistic identified by 6 is the north-seeking unit, which consists of a pair of pots 7 and 8, a pipe intercommunicating the pots 7 and 8 and a liquid 9 contained in the pots 7 and 8 and the intercommunicating pipe 10 in a manner to fill the pipe 10 and the lower half of each pot. If now the spin axis A–B is inclined about the horizontal shaft 11 from the true horizontal level, the liquid 9 flows from a higher pot through the intercommunicating pipe 10 into a lower pot and the lower pot becomes heavier than the higher one, so that gravity acting on the lower pot exceeds that on the higher one to increasingly push down the lower pot. Consequently, the north-seeking unit 6 produces about the horizontal shaft 11 a torque proportionate to the inclination of the gyro spin axis from the horizontal level in a direction in which the lowered pot increasingly goes down.

The ballistic 6 and the gyro case 5 are adapted to move as one body about the horizontal shaft 11.

Since the tilt integrator mentioned above is known in the art, no further detailed description will be given in this specification for the sake of brevity. With the gyrocompass employing the tilt integrator, the so-called latitudinal error is not produced, the gyro spin axis rests horizontally irrespective of the latitude of the location of the gyrocompass and fixed torques caused by mass unbalance about the horizontal shaft and the like are all automatically cancelled by the torque produced by the tilt integrator, so that extremely high precision can be obtained. However, although the gyroscopic instrument equipped with the tilt integrator shown in FIG. 1 exhibits extremely high precision, it has a defect that the maximum value of the torque produced is small for the following reason. Namely, the size of the bubble 3 in this tilt integrator cannot be increased indiscreetly and accordingly the torque produced by the movement of the bubble is only several gram centimeters at maximum. Therefore, the tilt integrator $U_1$ is of particular utility when employed in small gyros well actuated by such small torque but the unit $U_1$ cannot be used with large gyros for the reason mentioned above.

In FIG. 3 there is illustrated a known electrolytic level accelerometer $U_2$. The unit $U_2$ consists of a curved cylindrical tube 101, an electrolyte 102, a bubble 103 and electrodes 112, 113 and 114 enclosed in the tube 101. The unit $U_2$ is similar in construction to a spirit level but is different from the tube 1 depicted in FIG. 1 in that the inner surface 104 of the tube 101 is curved in the plane of the sheet of the drawing. Accordingly, the positions of the bubble 103 to right and left are in proportion to the inclinations of the unit $U_2$ to right and left. In the unit $U_2$ the electric resistances of the electrolyte 102 between the electrodes 112 and 113 and between the electrodes 114 and 113 vary with the position of the bubble 103, so that the position of the bubble, that is, the inclination of the gyro spin axis of the gyro case equipped with the unit $U_2$ can be picked up in the form of an electric signal.

FIG. 4 shows the unit $U_2$ as applied to a gyrocompass, in which reference characters $A_1$–$B_1$ indicate the gyro spin axis and reference numeral 105 designates a gyro case having incorporated therein a gyro rotor and 111 a horizontal shaft identical with that indicated at 11 in FIG. 2.

In FIG. 4 the unit $U_2$ is mounted on the gyro case 105 in parallel with the spin axis $A_1$–$B_1$. Electric signals picked up from the pairs of electrodes 112, 113 and 114, 113 in proportion to the inclination of the spin axis are phase-discriminated by an AC bridge circuit 115 and amplified by an amplifier 116, thereafter being applied to a torquer 119 through a mixer circuit 118. In the present example the torquer 119 comprises a rotor 121 disposed about the horizontal shaft 111 and a stator 120 disposed in adjacent but spaced relation thereto. The stator 120 includes fix windings (connected to terminals 122 and 123) and control windings connected to the mixer circuit 118, and AC voltages displaced 90 degrees apart in phase are respectively applied to the fix and control windings, by which the torquer 119 produces a torque based on the theory of an induction motor. The rotor 121 is mounted on the gyro case 105 and the stator 120 is attached to a horizontal shaft support of a gyro support means, though not shown. If now the gyro spin axis $A_1$–$B_1$ is inclined, signals proportionate to the inclination are fed to the torquer 119 through the bridge circuit 115, the amplifier 116 and the mixer circuit 118. In this case, a voltage phased 90 degrees apart from the output of the mixer circuit 118 is applied to the terminals 122 and 123 in advance, by which a torque is applied to the gyro about the horizontal shaft 111 in proportion to the inclination of the gyro spin axis by the torquer 119, causing the gyro to perform the north-seeking action. While, one portion of the output of the amplifier 116 is fed to an integrator 117 to be integrated and is then mixed with the output of the amplifier 116 in the mixer circuit 118, thereafter being applied to the torquer 119, so that the gyro is supplied with a torque proportionate to the integrated value of the inclination of the spin axis by the latter loop. Thus, the device illustrated in FIG. 4 can function as a gyrocompass equipped with a tilt integrator.

It is necessary in such a case that the integrator 117 is constructed in the form of a servo mechanism for the following reason. Namely, the integrator for gyrocompasses is required to operate in such a manner that when the inclination of the gyro is several minutes it is integrated for several hours to produce a torque of several gram to several ten gram centimeters, and there is no useful means except a servo system using a gear train having a gear ratio of several ten millions to comply with such requirement. It is difficult to effect such a slow integration by the techniques of usual analog computers.

The present invention is to provide an excellent integrator for gyros which is free from the various drawbacks experienced in the conventional gyroscopic instruments described in the foregoing.

With reference to the drawings a detailed description will be given of this invention. In FIG. 5 there is illustrated one example of a tilt integrator produced according to this invention, generally designated by $U_3$, which consists of a cylindrical tube 201 having enclosed therein electrodes 213, 212 and 214, an electrolyte 202 and a bubble 203. The unit $U_3$ illustrated in FIG. 5 differs from that $U_2$ of FIG. 3 in the following two points.

(1) The cylindrical tube 201 is not curved in the plane of the drawing sheet. In other words, the inner surface 204 of the tube with which the bubble 203 gets in touch is completely cylindrical.

(2) The electrolyte 202 is of far higher viscosity than that 102 of the unit $U_2$. The electrolyte 202 may be made of a sulfate of a high molecular organic acid mixed with an electrolyte such as for example potassium iodide. It is to be realized that the viscosity of the liquid is increased as the molecular number of the organic acid becomes greater.

In the unit $U_3$ depicted in FIG. 5 the position of the bubble 203 is in proportion to the integration of the gyro inclination and is electrically detected to provide the integrated value of continuously changing gyro inclination in the form of an electric signal.

FIG. 6 illustrates, by way of example, a gyrocompass employing the tilt integrator $U_3$ described above, in which reference numeral 205 identifies a gyro case having mounted thereon the unit $U_2$ of FIG. 3 in the same manner as in FIG. 4, the unit $U_2$ having mounted thereon the unit $U_3$ of FIG. 5. As long as the units $U_2$ and $U_3$ are arranged in such a manner that their reference axes may lie in parallel with the spin axis $A_2$–$B_2$ of the gyro rotor housed in the gyro case, the arrangement of the units need not be strictly restricted to that shown in FIG. 6. With such an arrangement, a signal derived from the unit $U_2$ in proportion to the inclination of the gyro spin axis is phase-discriminated by an AC bridge circuit 215 and is amplified by an amplifier 216, thereafter being applied through a mixer circuit 218 to a torquer 219 to cause the gyro to perform the north-seeking action, as in the case of FIG. 4. At the same time, a signal from the unit $U_3$ is fed to the torquer 219 through an AC bridge circuit 215′ and an amplifier 216′ of exactly the same construction as the circuits 215 and 216 and the common mixer circuit 218, by which a torque is applied to the gyro about its horizontal shaft in proportion to the integrated value of the inclination of the gyro spin axis, thus constituting a gyrocompass equipped with a tilt integrator.

Namely, the present example does not necessitate the use of the expensive integrator 117 required in the example of FIG. 4 and suitable selection of the gain of the amplifier 216 enables the torquer 219 to produce a large torque unobtainable with the unit $U_1$ shown in FIG. 1. Thus, this invention eliminates the aforementioned drawbacks encountered in the conventional units.

Since the damping device of the gyrocompass is not directly related to this invention, no description will be made thereon for the sake of brevity in this specification.

In FIGS. 8 and 9 there are illustrated other examples of the tilt integrator of this invention, which is different from that of FIG. 5 in the position and construction of the electrodes disposed in the tube but is the same as the example of FIG. 5 in that the position of the bubble in the tube is picked up in the form of an electric signal. In these figures similar elements to those in FIG. 5 are identified by the similar reference numerals.

In the tilt integrator $U_3'$ depicted in FIG. 7 electrodes 212 and 214 are located in the position of the electrode 213 of the example of FIG. 5 and a common electrode 213 is disposed in the tube 201 on the opposite side from the bubble 203 substantially at the center of the tube 201, and the other constructions are exactly the same as those in FIG. 5.

The tilt integrator $U_3''$ exemplified in FIG. 8 is different from that depicted in FIG. 7 in that electrodes corresponding to the electrodes 212 and 214 of the unit $U_3'$ are substantially plate-like and are fixed or embedded in the tube 201 on the opposite side from the common electrode 213, that is, on the side of the bubble 203, and the other constructions are exactly the same as in FIG. 7.

Although the mixer circuit 218 is provided at the stage subsequent to the circuits 216 and 216' in the example shown in FIG. 6, it may be, of course, disposed at a stage preceding to them. Namely, it is possible that the outputs of the circuits 215 and 215' are directly mixed in the mixer circuit 218 and then applied to either one of the amplifiers, for example, 216, in which case the amplifier 216' may be omitted. Further, the AC bridge circuits 215 and 215' may be incorporated in the mixer circuit 218. Various other detector and amplifier means are employed between the circuits 215 and 218 but no detailed description will be given thereof, since they are not directly related to this invention. However, they should be construed as falling inside of the scope of this invention. In addition, the torquer 219 may take various forms known in the art and they should be naturally construed as falling within the scope of this invention.

While, the tilt integrator of this invention has been described as applied to a gyrocompass, it may be applied to other gyroscopic instruments such as a vertical gyro, azimuth and attitude differencer system and so on to provide for enhanced precision and improved performance.

Such enhancement of the precision cannot be attained only by applying the unit $U_1$ of FIG. 1 to such instruments, because the unit $U_1$ produces a torque only about a shaft at right angles to the sheet of the drawing (that is, the shaft 11 in FIG. 2) in proportion to the integrated value of the gyro inclination about the same shaft. While, with the use of this invention described with FIGS. 5 and 6, a torque proportionate to the integrated value of the inclination detected by the unit $U_3$ can be applied about a desired shaft by mounting the torquer on other shaft, so that high precision instruments such as described above can be obtained. In this very sense, the vertical gyro is a typical example of those instruments to which the unit $U_1$ of FIG. 1 cannot be applied but the unit $U_3$ of the invention described with FIGS. 5, 7 and 8 can be applied to provide for excellent performance.

FIG. 9 illustrates another modified form of the integrator of this invention which is of particular utility when employed in an instrument such as the vertical gyro. The integrator, generally designated by $U_4$ comprises a container 301 of cylindrical or square cross-section, a highly viscous electrotype 302 enclosed therein, electrodes 313 and 313' immersed in the electrolyte 302 in a manner to run across each other at right angles, electrodes 312 and 314 disposed under the electrode 313 in parallel therewith and electrodes 312' and 314' placed under the electrode 313' in parallel therewith. The surface 304 of the container 301 is not curved but flat and a bubble 303 is enclosed in the container 301. With the arrangement, the bubble 303 is round when looked from above and the bubble 303 carries out a motion of two dimensions between the highly viscous electrolyte 302 and the surface 304, so that inclinations about two axes running parallel with and at right angles to the electrodes 313 and 313' can be simultaneously integrated and rendered in the form of electric signals.

FIG. 10 shows one example of a vertical gyro employing the tilt integrator $U_4$ depicted in FIG. 9, in which reference numeral 405 indicates a gyro case and $A_3$–$B_3$ designates the spin axis of a rotor housed in the gyro case. The gyro case 405 is supported by a horizontal ring 432 rotatably about a first horizontal shaft 411. The horizontal ring 432 is, in turn, supported by second horizontal shafts 431 and 431' to a support (not shown) in a manner to be rotatable about the shafts 431 and 431'. The support system that the gyro case is provided with three degrees of freedom so as to lay the spin axis $A_3$–$B_3$ vertically, is well known in the art, and accordingly no further description will be given in this specification. In the illustrated example the accelerometer $U_2$ shown in FIG. 3 is mounted on the gyro case 405 in such a manner as to sense inclination in a direction of the line CD on a plane crossing the gyro spin axis $A_3$–$B_3$ at right angles thereto and including the spin axis $A_3$–$B_3$ and the axes of the second horizontal shafts 431 and 431'. While, an electrolyte level accelerometer $U_2'$ of exactly the same construction as the accelerometer $U_2$ is mounted on the gyro case 405 in a manner to lie at right angles to the accelerometer $U_2$, that is, in parallel with the shaft 411. Further, the tilt integrator $U_4$ is mounted on the gyro case 405 in parallel with the plane including the line CD and the first horizontal shaft 411. Namely, the tilt integrator $U_4$ is arranged so that its two electrodes 313 and 313' may lie respectively in parallel with the line CD and the shaft 411. In addition, torquers 420 and 421 of identical construction with those 220 and 221 shown in FIG. 6 are disposed around the first horizontal shaft 411 and similar torquers 520 and 521 are provided around the shaft 431'.

A discussion will hereinbelow be given of the operational principles of the vertical gyro exemplified in FIG. 10. When the gyro spin axis $A_3$–$B_3$ is inclined from a true vertical, the unit $U_2$ generates electric signals in proportion to the inclination and the electric signals are phase-discriminated by an AC bridge circuit 415''' and amplified by an amplifier 416', thereafter being applied through a mixer circuit 418' to the torquers 520 and 521 to produce a torque around the line CD. With this torque, the gyro causes a precession around the shaft 411 to decrease the signals derived from the unit $U_2$. Therefore, this system ensures to hold the spin axis $A_3$–$B_3$ substantially vertical. In a similar manner, a control system consisting of a $U_2'$, an AC bridge circuit 415, a mixer circuit 418, an amplifier 416 and the torquers 420 and 421 controls the spin axis $A_3$–$B_3$ around the shafts 431 and 431' to maintain it substantially vertical. However, since mass unbalance of the gyro case 405 and the horizontal ring 432 about the shafts 411 and 431 and the revolution of the earth always exert an influence upon the gyro, the spin axis $A_3$–$B_3$ cannot be held in true vertical by the above-described system only, as is well known in the art. With this invention, the signals generated by the tilt integrator $U_4$ are respectively fed through AC bridge circuits 415' and 415'' to the mixer circuits 418 and 418' to be added with the signals produced by the units $U_2$ and $U_2'$, thereby reducing the above error to zero. Namely, when the spin axis $A_3$–$B_3$ is deviated from the true vertical due to the revolution of the earth, mass unbalance and so on, the unit $U_4$ feeds signals, obtained by time-integrating the error, to the torquers through the mixer and amplifier circuits 418, 418' and 416, 416', thus controlling the gyro to bring the spin axis $A_3$–$B_3$ to agree with the true vertical. When the spin axis has been brought to lie in the true vertical, the integrating action of the unit $U_4$ is stopped and constant signals being produced at that time cause the torquers to generate a constant torque. This torque has a magnitude capable of cancelling the torque due to the mass unbalance and the motion of the gyro resulting from the revolution of the earth.

As will be apparent from the foregoing, the instrument shown in FIG. 10 is a vertical gyro completely free from errors and exhibits highly excellent performance in practical use.

While the present invention has been described in connection with the tilt integrator using a non-curved cylindrical tube containing the highly viscous liquid and the bubble in FIGS. 5, 7, 8 and 9, the foregoing examples are intended as being illustrative and not as limiting the invention specifically thereto. Namely, it is possible that a non-conductive highly viscous liquid and a bubble are enclosed in a non-curved cylindrical tube and that the position of the bubble is picked up in the form of an electric signal by the use of an optical system and a photocell. Further, it is also possible that a highly viscous liquid and a ball formed of, for example, a magnetic material instead of the bubble are enclosed in a non-curved cylindrical tube and that the position of the magnetic ball is detected in the form of an electric signal by electromagnetic means, for instance, a differential transformer or the like.

In the present invention described above the viscosity of the electrolyte used in the tilt integrator is selected high for the following reasons. Assuming that the gyro spin axis A–B is inclined an angle $\theta$ relative to the horizontal level to lower its one side B in the example shown in FIG. 2, the ballistic 6 produces about the horizontal shaft 11 a torque $T_B = K_B\theta$ ($T_B$: torque produced by the ballistic, and $K_B$: torque constant of the ballistic) in proportion to the inclination of the spin axis and the tilt integrator $U_1$ produces about the horizontal shaft 11 a torque $T_I = K_I \times \int \theta dt$ ($T_I$: torque produced by the integrator, and $K_I$: torque constant of the integrator) in proportion to the time integral of the inclination of the ballistic as has been described in the foregoing. Namely, the total or composite torque T about the horizontal shaft 11 is the sum of the torques produced by the ballistic and the tilt integrator as follows:

$$T = T_B + T_I$$
$$= K_B\theta + K_I\int\theta dt$$
$$= K_B\left(\theta + \frac{K_I}{K_B}\int\theta dt\right)$$
$$= K_B\left(\theta + \frac{1}{\tau}\int\theta dt\right)$$

where $\tau = K_B/K_I$ and is referred to as the integration time. It might be said that the integration time is a time until which the tilt integrator comes to produce a torque equal to that produced by the ballistic for a certain gyro inclination.

Also in the cases of FIGS. 4 and 6 the total torque can be given by the same equation.

In the gyrocompass the torque constant $K_B$ of the ballistic is dependent upon the conditions for cancelling errors of the gyrocompass caused by the acceleration of increase and decrease in speed or turning of, for example, a ship, that is, upon the Schuler turning. Accordingly, the constant $K_I$ of the integrator is expressed by the integration time $\tau$. The integration time $\tau$ depends upon the size of the sealed tube or container of the tilt integrator, the specific gravity or viscosity of the liquid contained in the sealed tube or container but in particular it is dependent primarily upon the viscosity of the liquid. An increase in the viscosity of the liquid prolongs the integration time, while a decrease shortens the integration time. With too short integration time, the so-called dispersing phenomenon is caused to prevent the gyro from resting toward true north.

Therefore, it is of importance in the tilt integrator that its integration time be long. This is the very reason for which the viscosity of the liquid is selected high in the integrators of this invention described in the foregoing. In gyrocompasses now in practical use the viscosity of the liquid used in the integrator is selected high and the integration time is selected more than twenty minutes.

It will be apparent that many modifications and variations may be effected without departing from the scope of the novel concepts of this invention.

I claim as my invention:

1. A gyroscopic instrument comprising a gyroscope, a tilt integrator mounted in association with said gyroscope, torque generating means, said tilt integrator consisting of a sealed container having a longitudinal axis, a fluid enclosed within said container, a moving member sealed in said container which is insoluble in and nonmiscible with said fluid and has a specific gravity different from that of said fluid, means disposed in said sealed container for detecting the position of said moving member and producing an electrical signal, said detecting means consisting of a common electrode and a pair of electrodes opposed thereto, the inner surface of said sealed container which contacts said moving member being substantially straight in a direction of said longitudinal axis, said torque generating means receiving said electrical signal from said detecting means to produce a torque in accordance with said electrical signal and said torque being applied to said gyroscope to control the attitude thereof.

2. A gyroscopic instrument as claimed in claim 1 comprising an accelerometer further provided in association with said gyroscope for producing an output in accordance with the inclination of the spin axis of said gyroscope with respect to the horizontal plane, the output of said accelerometer being applied to the torque generator means in addition to said electrical signal from said detecting means to maintain the spin axis of said gyroscope substantially horizontal.

3. A gyroscopic instrument as claimed in claim 1 comprising two accelerometers further provided the longitudinal axes of which are perpendicular with each other and also perpendicular to the spin axis of said gyroscope, and another torque generator means is provided in association with said gyroscope and the outputs of said two accelerometers being respectively applied to said two torque generator means to maintain said spin axis substantially vertical.

References Cited

UNITED STATES PATENTS

| | | | |
|---|---|---|---|
| 1,866,706 | 7/1932 | Henderson | 33—226 |
| 2,446,180 | 8/1948 | Haskins | 74—5.6 XR |
| 2,713,726 | 7/1955 | Dixson | 33—211 |
| 3,009,255 | 11/1961 | Robillard | 33—211 |
| 3,321,841 | 5/1967 | Kawada | 33—226 |

MANUEL A. ANTONAKAS, Primary Examiner

U.S. Cl. X.R.

33—211, 226; 74—5.8